(12) United States Patent
Martin San Juan

(10) Patent No.: US 6,418,491 B1
(45) Date of Patent: Jul. 9, 2002

(54) APPARATUS AND METHOD FOR CONTROLLING TIMING OF TRANSFER REQUESTS WITHIN A DATA PROCESSING APPARATUS

(75) Inventor: Martin Martin San Juan, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/339,954

(22) Filed: Jun. 25, 1999

(30) Foreign Application Priority Data

Jul. 9, 1998 (GB) .............................................. 9814924

(51) Int. Cl.[7] .............................................. G06F 13/00
(52) U.S. Cl. .............................. 710/100; 710/5; 710/25; 710/27; 710/52; 710/56; 710/58; 710/60; 710/305
(58) Field of Search ................................ 710/305, 100, 710/25, 27, 5, 52, 56, 58, 60

(56) References Cited

U.S. PATENT DOCUMENTS

| | | | | |
|---|---|---|---|---|
| 3,864,578 A | * | 2/1975 | Lackey ...................... 307/10.1 |
| 5,101,347 A | * | 3/1992 | Balakrishnan et al. ...... 710/106 |
| 5,191,653 A | * | 3/1993 | Banks et al. ................. 710/113 |
| 5,201,036 A | * | 4/1993 | Yoshimatsu ................. 710/107 |
| 5,285,323 A | * | 2/1994 | Hetherington et al. ...... 711/122 |
| 5,371,863 A | * | 12/1994 | Silver ......................... 710/128 |
| 5,392,422 A | * | 2/1995 | Hoel et al. ................... 710/113 |
| 5,548,787 A | | 8/1996 | Okamura | |
| 5,694,614 A | | 12/1997 | Bennett | |

FOREIGN PATENT DOCUMENTS

| | | |
|---|---|---|
| EP | 0 463 775 | 1/1992 |
| EP | 0 797 152 | 3/1996 |
| EP | 0 806 729 | 5/1996 |

* cited by examiner

*Primary Examiner*—Rupal Dharia
(74) *Attorney, Agent, or Firm*—Nixon & Vanderhye P.C.

(57) ABSTRACT

The present invention provides a data processing apparatus and method for controlling timing of transfer requests. The data processing apparatus comprises a bus for interconnecting a number of logic units, data being transferable between the logic units via the bus. A first logic unit is arranged to issue onto a bus a transfer request and a type signal indicating the type of the transfer request, and a second logic unit is arranged to receive the transfer request from the bus and to perform an operation in response to the transfer request. In accordance with the present invention, the first logic unit is arranged to encode within the type signal a timing indication used to control the timing of the receipt of the transfer request by the second logic unit.

By this approach, the performance of the data processing apparatus can be increased, since the performance of transfer requests can be governed directly by the actual performance of the logic unit issuing the transfer request.

14 Claims, 4 Drawing Sheets

APPARATUS AND METHOD FOR CONTROLLING TIMING OF TRANSFER REQUESTS WITHIN A DATA PROCESSING APPARATUS

BACKGROUND OF THE INVENTION

1. Field of the Invention

The present invention relates to an apparatus and method for controlling timing of transfer requests within a data processing apparatus.

2. Description of the Prior Art

A data processing apparatus will typically have a number of logic units that are interconnected via a bus, with data being transferable between the logic units via the bus. To effect such a transfer, a first logic unit may output a transfer request on to the bus, this transfer request being destined for a second logic unit. The second logic unit will then retrieve the transfer request from the bus and perform an appropriate operation in order to process the transfer request. Logic units that are designed to initiate transfer requests can be referred to as "master" logic units, whilst logic units that are designed to be recipients of such transfer requests can be referred to as "slave" logic units.

The master logic unit initiating a transfer request must drive a number of transfer request signals on to the bus in order to sufficiently define the transfer request to enable the slave logic unit to perform the appropriate operation in response to the transfer request. Hence, the master logic unit will typically output various control signals, for example identifying the type of operation to be performed by the slave logic unit, (e.g. a read or a write operation), the type of transfer (e.g. with regards to addresses, whether the transfer is a sequential, or non-sequential transfer), the size of the access (e.g. word, byte), the operating mode of the master logic units (e.g. supervisor or user mode), etc. Further, the master logic unit will typically output an address signal identifying the address at which the slave logic unit is to apply the operation.

It will be apparent that the master logic unit will require a certain amount of time to drive the necessary transfer request signals to a valid value on the bus, and that to ensure correct operation, the slave logic unit should not retrieve the signals from the bus, or at least not perform any operation required by the transfer request, until all of the necessary transfer request signals have been driven on the bus to the correct value by the master logic unit.

Generally a system clock is employed to control the frequency of operation of the various logic units within the data processing apparatus, and the slave logic unit will be arranged to sample the contents of the bus at a particular point in a clock cycle, for example the falling edge of the clock cycle. If all of the master logic units are able to drive the necessary transfer request signals on to the bus during the same clock cycle that they initiate a transfer request, then clearly the slave logic unit can sample the contents of the bus at the end of that clock cycle, and proceed to perform the necessary operation. However, if one or more of the master logic units is not able to output all of the necessary transfer request signals on to the bus during the same clock cycle that it initiates a transfer request, then it is important that the slave logic unit does not perform any operation on the basis of the contents of the bus at the end of that cycle, but rather waits until a subsequent clock cycle before reading the contents of the bus and performing the necessary operation.

Hence, prior art data processing apparatus have typically fallen into two categories. If all of the master logic units within the data processing apparatus are capable of issuing the necessary transfer request signals on to the bus during the same clock cycle that they initiate a transfer request, then the second logic unit is merely arranged to read the contents of the bus at the earliest opportunity, and perform the necessary operation. However, for data processing apparatus where at least one of the master logic units is not able for at least certain types of transfers to reliably provide the necessary transfer request signals on the bus at the end of the clock cycle in which the transfer request is initiated, then for those types of transfer requests a delay is typically inserted into the process, such that the slave logic unit does not read the contents of the bus until the end of the delay.

It will be appreciated that the insertion of a delay for certain types of bus transfers adversely affects the performance of the data processing apparatus. This is particularly true where the processing request happens to be being issued by a master logic unit that can provide the necessary signals on the bus during the same clock cycle that the transfer request is initiated, since the delay is applied irrespective of the master logic unit issuing the transfer request. In effect, the performance of all of the master logic units is restricted by the performance of the slowest master logic unit in the data processing apparatus.

Further, the above approach can unnecessarily affect the performance of even the slowest logic unit in the data processing apparatus in cases where its signal timing improves. One example of this is when the system is run at a lower clock frequency than originally designed, and, as a result of this, the original timing constraints disappear.

It is hence an object of the present invention to provide an improved technique for controlling timing of transfer requests within a data processing apparatus.

SUMMARY OF THE INVENTION

Viewed from a first aspect, the present invention provides a data processing apparatus, comprising: a bus for interconnecting a number of logic units, data being transferable between the logic units via the bus; a first logic unit for issuing onto a bus a transfer request and a type signal indicating the type of the transfer request; a second logic unit for receiving the transfer request from the bus and performing an operation in response to the transfer request; the first logic unit being arranged to encode within the type signal a timing indication used to control the timing of the receipt of the transfer request by the second logic unit.

In accordance with the present invention, when the first logic unit issues on to the bus a transfer request, and a type signal indicating the type of the transfer request, it is also arranged to encode within the type signal a timing indication used to control the timing of the receipt of the transfer request by the second logic unit. Hence, if the first logic unit is able to issue the necessary transfer request signals on to the bus relatively quickly, for example as compared with other logic units within the data processing apparatus, then this can be reflected within the timing indication encoded within the type signal, and can be used to avoid any unnecessary delay in the receipt of the transfer request by the second logic unit. Similarly, if the first logic unit cannot issue the necessary transfer request signals quite so quickly, this can also be reflected within the timing indication encoded within the type signal, and can be used to ensure that an appropriate delay occurs before the transfer request is received from the bus by the second logic unit.

By this approach, the performance of the data processing apparatus can be increased, since the performance of transfer requests is no longer restricted by the performance of the slowest logic unit that may initiate a transfer request. Instead, the timing of the transfer request can be governed by the actual performance of the logic unit issuing the transfer request, and therefore the data processing apparatus can take advantage of the performance increase available when logic units drive the necessary transfer request signals on to the bus relatively quickly, and hence the standard delay typically inserted by prior art data processing apparatus is not required.

Further, in accordance with the present invention, the performance loss that occurs in prior art systems when signal timing improves under specific circumstances can also be avoided. For example, if the system is run at a lower clock frequency than originally designed, for example as may occur during testing, then a particular logic unit that might normally require a delay to be inserted when it issues a transfer request may no longer need that delay to be inserted because of the reduced clock frequency, and this can be reflected in the timing indication encoded within the type signal issued by that logic unit.

The second logic unit may be arranged to receive the type signal directly, and to determine from the timing indication when to receive the transfer request from the bus. However, in preferred embodiments, the data processing apparatus further comprises a decoder for asserting a select signal to the second logic unit to cause the second logic unit to read the transfer request from the bus, the decoder being arranged to receive the type signal from the bus and to determine from the timing indication when to assert the select signal to the second logic unit.

Hence, in preferred embodiments, the decoder determines from the transfer request signals issued by the first logic unit which logic unit should receive the transfer request, and from the timing indication encoded within the type signal determines when to inform that logic unit that it should read the transfer request from the bus.

In preferred embodiments, the data processing apparatus further comprises a clock generator for generating a clock signal having a predetermined clock cycle, the timing indication encoded in the type signal indicating in which clock cycle the transfer request should be received from the bus by the second logic unit.

Preferably, the timing indication identifies whether the transfer request is available to be received from the bus by the second logic unit during the same clock cycle that the type signal is generated by the first logic unit, or in a predetermined subsequent clock cycle.

It will be appreciated by those skilled in the art that there are various types of transfer request which may be issued by the first logic unit, and that the timing constraints may be different for different types of transfer request. Certain types of transfer request can inherently be performed quicker than others. For example, burst transfers to sequential addresses, commonly known as sequential transfers, are typically relatively fast, because the signals output on to the bus are generally related to the signals of the previous transfer and hence little change to the signals is often required. In contrast, certain types of transfer request, such as non-sequential transfers, in which the address of the transfer is unrelated to the address of the previous transfer, are often relatively slow, since the various transfer request signals to be issued on to the bus are generally unrelated to those of the previous transfer.

In preferred embodiments, if the transfer request is a non-sequential transfer and the first logic unit is able to drive on to the bus during the same clock cycle that the type signal is generated the transfer request signals required by the second logic unit, the timing indication encoded into the type signal indicates that the transfer request is available to be received from the bus by the second logic unit during the same clock cycle that the type signal is generated by the first logic unit. However, if the transfer request is a non-sequential transfer and the first logic unit is able to drive on to the bus by the predetermined subsequent clock cycle the transfer request signals required by the second logic unit, then in preferred embodiments the timing indication encoded into the type signal indicates that the transfer request is available to be received from the bus by the second logic unit during the predetermined subsequent clock cycle.

In preferred embodiments, the data processing apparatus further comprises: a decoder for asserting a select signal to the second logic unit to cause the second logic unit to read the transfer request from the bus, the decoder being arranged to receive the type signal from the bus; if the timing indication indicates that the transfer request is available to be received from the bus by the second logic unit during the same clock cycle that the type signal is generated by the first logic unit, then the decoder being arranged to assert the select signal without delay; and if the timing indication indicates that the transfer request is available to be received from the bus by the second logic unit during the predetermined subsequent clock cycle, then the decoder being arranged to delay asserting the select signal until said predetermined subsequent clock cycle.

The predetermined subsequent clock cycle can be chosen to be any subsequent clock cycle, and will depend on factors such as the operating speed of the logic unit issuing the transfer request. However, in preferred embodiments the predetermined subsequent clock cycle is the clock cycle immediately following the clock cycle in which the type signal is generated by the first logic unit.

Typically, the second logic unit is arranged to read the transfer request from the bus at a predetermined point in the clock cycle indicated by the timing indication. Hence, for example, the second logic unit may be arranged to sample the contents of the bus during the falling edge of the clock, and hence will read the transfer request from the bus during the falling edge of the clock in the clock cycle indicated by the timing indication.

It will be appreciated by those skilled in the art that the format of the type signal can be varied as required, without departing from the scope of the present invention. However, in preferred embodiments the type signal is a two-bit signal, and the value of the two bits provides the timing indication in addition to identifying the type of the transfer request.

Viewed from a second aspect the present invention provides a method of controlling timing of transfer requests employed in a data processing apparatus to transfer data between logic units interconnected by a bus, comprising the steps of: issuing onto the bus from a first logic unit a transfer request and a type signal indicating the type of the transfer request; receiving at a second logic unit the transfer request from the bus and performing an operation in response to the transfer request; and encoding within the type signal a timing indication used to control the timing of the receipt of the transfer request by the second logic unit.

BRIEF DESCRIPTION OF THE DRAWINGS

The present invention will be described further, by way of example only, with reference to preferred embodiments thereof as illustrated in the accompanying drawings, in which.

DESCRIPTION OF A PREFERRED EMBODIMENT

Figure 1:
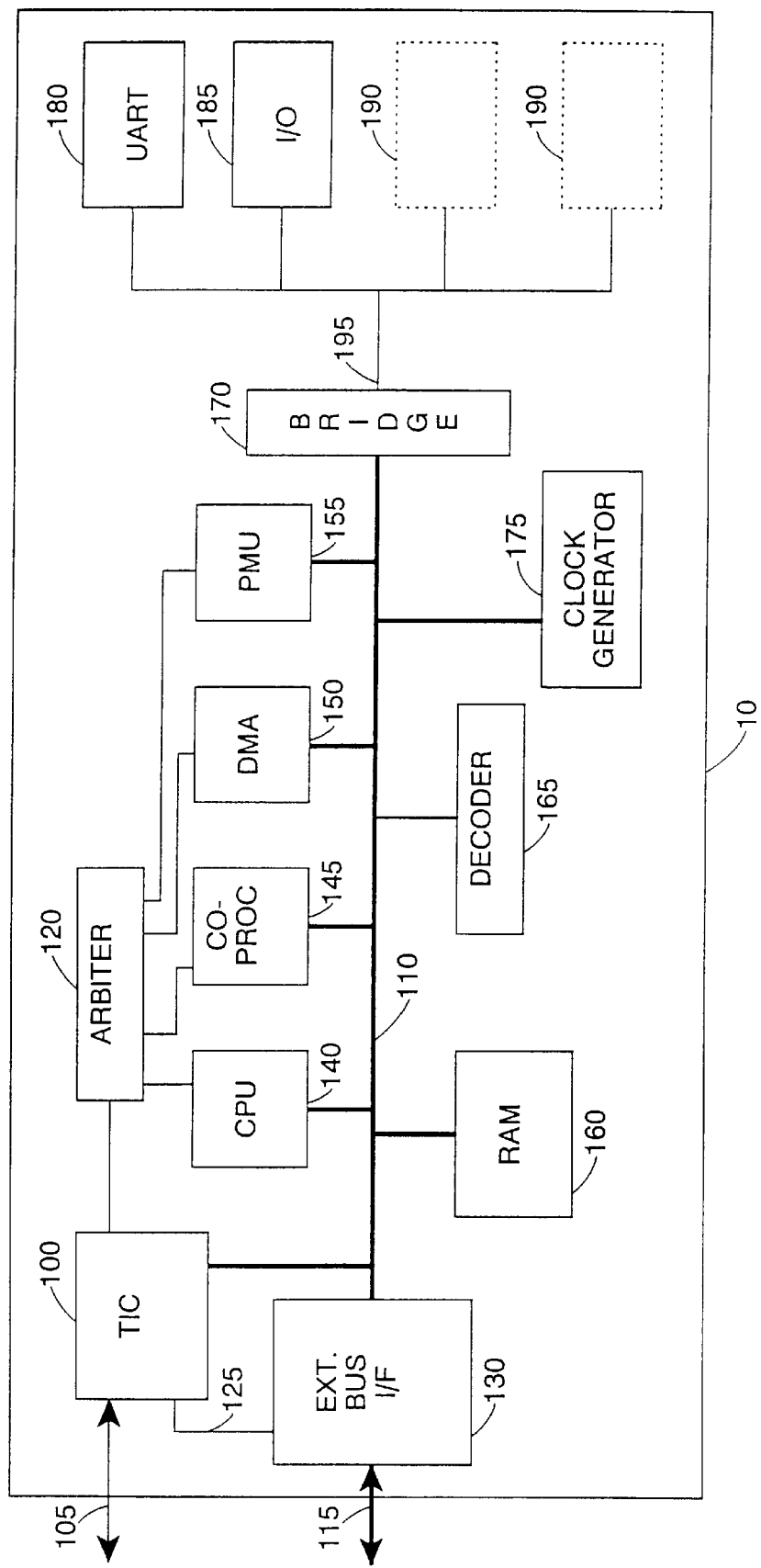
FIG. 1 is a block diagram illustrating a data processing apparatus in accordance with preferred embodiments of the present invention.

FIG. 1 illustrates a data processing apparatus in accordance with the preferred embodiment of the present invention, where the data processing apparatus takes the form of a microcontroller chip 10. The chip 10 has a system bus 110 and a peripheral bus 195 connected via a bridge circuit 170. In accordance with preferred embodiments of the present invention these buses operate in accordance with the "Advanced Microcontroller Bus Architecture" (AMBA) specification developed by ARM Limited. The AMBA specification defines an on-chip communication standard for designing high performance 32-bit and 16-bit embedded microcontrollers, with the system bus 110 being used for high performance system modules, whilst the peripheral bus is used for low power peripheral devices. The high performance system bus 110 is able to sustain the external memory bandwidth, with the CPU and other Direct Memory Access devices residing on the system bus, whilst a bridge circuit 170 connects the system bus to a narrower peripheral bus 195 on which the low bandwidth peripheral devices are located. The bridge circuit 170 performs the necessary protocol conversion between the system bus 110 and the peripheral bus 195.

It will be appreciated by those skilled in the art that there is no requirement for a data processing apparatus to employ the AMBA specification in order to benefit from the present invention, but rather the discussion of a chip employing the AMBA specification is provided herein merely to illustrate an example of a chip in which the present invention may be employed.

The chip 10 has a number of master logic units connected to the system bus 110 namely a test controller (referred to hereafter as a Test Interface Controller (TIC)) 100, a CPU 140, a coprocessor 145, a DMA controller 150, and a Power Management Unit (PMU) 155. Only one of the master logic units may have access to the system bus at any particular instance in time, and hence an arbiter 120 is provided to control access to the system bus 110 by the various master logic units. When a master logic unit wishes to have access to the system bus 110, it issues a bus request signal to the arbiter 120. If only one bus request signal is received by the arbiter 120 at any particular instance in time, it will grant access to the master logic unit that issued that bus request signal. However, if more than one bus request signal is received by the arbiter at any particular instance in time, the arbiter is arranged to apply predetermined priority criteria in order to determine which master logic unit should have access to the system bus 110. Of all of the master logic units requesting access to the bus, the arbiter 120 is arranged to grant access to the master logic unit having the highest priority. In preferred embodiments, the relative priorities of each master logic unit is as follows, with the highest priority master logic unit being listed first:

1 Test Interface Controller (TIC) 100
2 DMA controller 150
3 Power Management Unit (PMU) 155
4 CPU 140
5 Coprocessor 145.

Based on this predetermined priority criteria, it will be appreciated that the TIC 100 will always get access to the bus when requesting it, since it is the highest priority master logic unit. However, the TIC 100 will only request access to the bus when a test process is being performed, and hence during normal operation (when no testing is being performed), the TIC 100 will not hinder access to the system bus 110 by the other master logic units.

In addition to the master logic units, one or more slave logic units may be connected to the system bus 110. For the sake of clarity, only one slave logic unit, namely the Random Access Memory (RAM) 160 is illustrated in FIG. 1. When a transfer request is issued to a slave logic unit, an address will be output on the system bus 110, and this will be decoded by the decoder logic 165 in order to determine which slave logic unit is to handle the transfer request. The decoder will then notify the appropriate slave logic unit accordingly.

A number of peripheral devices may be connected to the peripheral bus 195. Two examples of such peripheral devices are a "Universal Asynchronous Receive and Transmit" (UART) logic unit 180 for receiving and transmitting serial data, and an input/output port 185. Further peripheral devices may also be added, as indicated by the dotted boxes 190 in FIG. 1.

The system bus 110 is also connected to an external bus 115 via an external bus interface 130. In preferred embodiments the external bus 115 is a 32-bit vector bus. When performing testing, the external bus interface 130 is used as a test access port, with test data and addresses being input over the external bus 115, whilst the TIC 100 controls the external bus interface 130 over path 125 dependent upon external control signals received by the TIC over path 105.

Further, a clock generator 175 is provided to control the frequency of operation of the various logic units connected to the system bus 110. Hence, the timing of transfer request signals output by a master logic unit is determined by the clock frequency of the clock generator 175.

Figure 2:
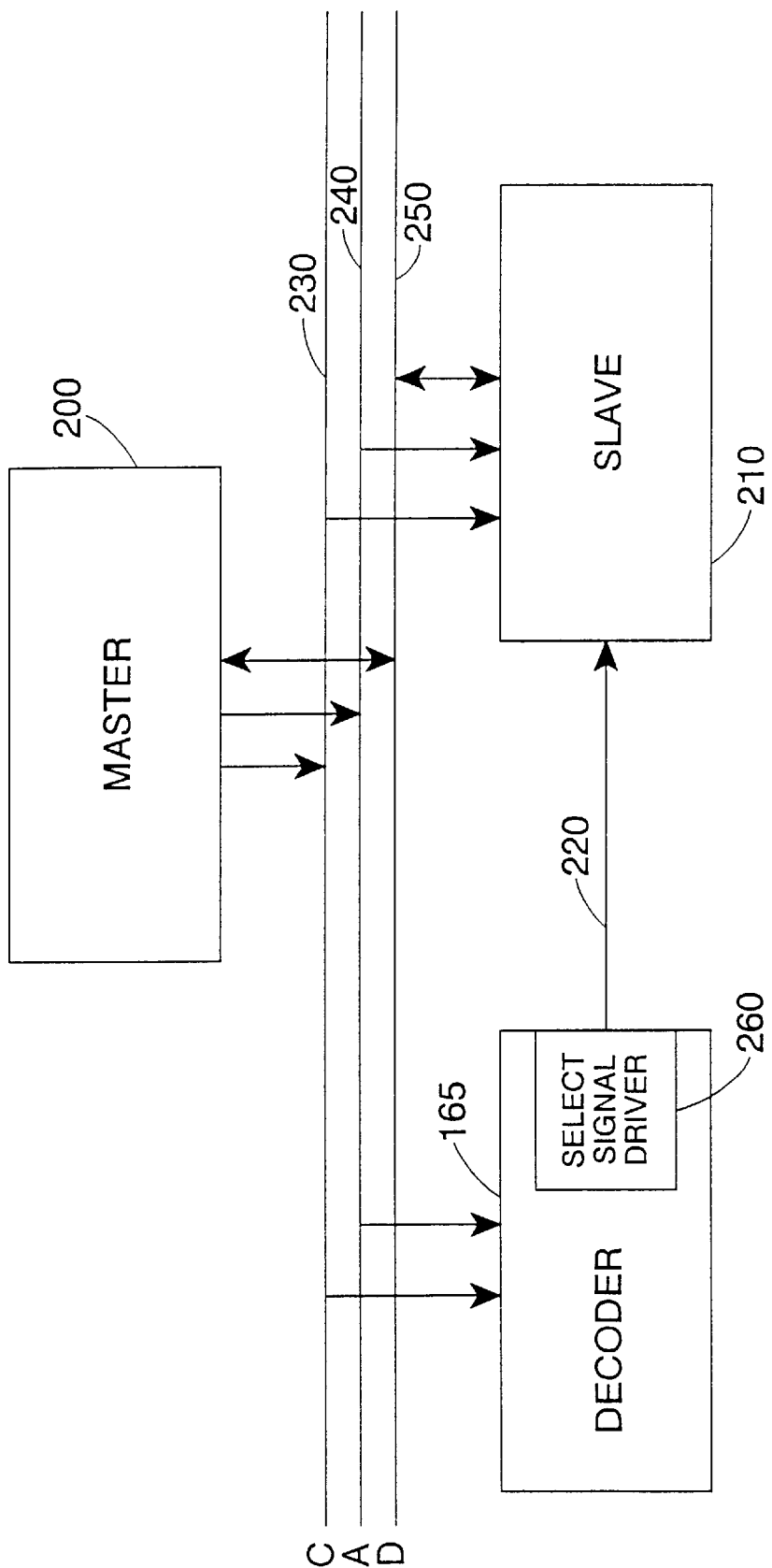
FIG. 2 is a block diagram illustrating in more detail a portion of the data processing apparatus illustrated in FIG. 1.

FIG. 2 is a block diagram illustrating in more detail a portion of the data processing apparatus illustrated in FIG. 1. The system bus 110 illustrated in FIG. 1 can actually be considered as three separate buses, namely a control bus 230, an address bus 240 and a data bus 250. When a master logic unit 200, which in the normal mode of operation may be in this example the CPU 140, the coprocessor 145, the DMA controller 150 or the PMU 155, wishes to issue a transfer request to a slave logic unit 210, for example the RAM 160, then having requested access to the bus and having been granted access by the arbiter 120, it will output various control signals on to the control bus 230, along with an address output on to the address bus 240. The control signals output on to the control bus include information such as whether the address corresponds to a read or a write operation, the type of transfer (e.g. sequential, non-sequential), the size of the access (e.g. word, byte), the operating mode of the master logic unit (e.g. supervisor or user mode), etc. If the operation is a read operation, the address will identify an address from which a data value (which may be an instruction, or data used by an instruction) should be read, and if the operation is a write operation the address to which a data value to be output by the master logic unit on the data bus 250 should be written.

The control and address signals output by the master logic unit 200 on the control bus 230 and address bus 240, respectively, are read by the decoder 165, which determines from the signals which slave logic unit should handle the transfer request, and the type of the transfer request. For example, if the address on the address bus 240 refers to an address within the RAM 160, then the decoder 165 will determine that the RAM should handle the transfer request. Having determined which slave logic unit 210 should handle the transfer request, a select signal driver 260 within the decoder 165 is arranged to output a select signal 220 to the appropriate slave logic unit 210 to cause that slave logic unit 210 to read the transfer request signals from the bus. In preferred embodiments, this involves the selected slave logic unit 210 reading the address and control signals from the address bus 240 and control bus 230, respectively. The slave logic unit 210 will then perform the necessary operation, such as writing a data value output on the data bus 250 by the master logic unit 200 to the identified address in the event of a write operation, or reading the data value stored at the identified address in the event of a read operation. In the event of a read operation, the data value read from the identified address is then output by the slave logic unit 210 on to the data bus 250, and subsequently read from the data bus 250 by the master logic unit 200.

In preferred embodiments, the system bus 110 operates in accordance with the AMBA specification, and in accordance with the AMBA specification, one of the control signals output on to the control bus 230 by the master logic unit 200 is referred to as a BTRAN signal, and bits 1 and 0 of this signal indicate the type of transfer the master logic unit 200 is about to perform. Traditionally, the transfer types indicated by the particular BTRAN [1:0] signal values are as follows:

| BTRAN [1:0] | TRANSFER TYPE |
|---|---|
| 00 | Address-only |
| 01 | Reserved |
| 10 | Non-sequential |
| 11 | Sequential |

The transfer type information relates fundamentally to the change of address and control signals in relation to the previous transfer, and this also affects the timing of those signals. In a sequential transfer, the address and control signals values are very similar to the values associated with the previous transfer, since the address will generally be the immediately subsequent address to the one identified in the previous transfer, and the control signals will remain unchanged.

Accordingly, for sequential transfers, the necessary transfer request signals (the control and address signals in preferred embodiments) can be output relatively quickly, typically within the same clock cycle that the transfer request is initiated by the master logic unit 200. Hence, the decoder 165 can cause the select signal to be issued to the appropriate slave logic unit 210 without delay since all of the necessary transfer request signals required by the slave logic unit 210 to process the transfer request will be available.

In an address-only transfer, which is used solely to keep the system bus driven, and not to cause any actual transfer to take place, the actual address output on the address bus is of no significance, and hence typically the address will not change from that of the previous transfer. Since an address-only transfer does not require any action by slave logic unit, the decoder 165 does not need to issue a select signal, and so the timing issue is not relevant.

However, for non-sequential transfers, the address and control signal values are typically unrelated to those of the previous transfer, and hence the master logic unit will generally take longer to drive the necessary transfer request signals to a valid value on the bus. Dependent on the master logic unit, the necessary transfer request signals may not be available to the slave logic unit 210 during the same clock cycle that the transfer request is initiated, and in such circumstances, the decoder 165 is required to wait for an extra clock cycle (hereafter referred to as a decode cycle) before issuing the select signal to the slave logic unit 210. By this approach, it can be ensured that the slave logic unit 210 does not read the contents of the bus before the required control and address signals have been driven onto the bus to a valid value by the master logic unit 200.

In a typical prior art data processing apparatus, if any of the master logic units is unable to reliably provide the necessary transfer request signals for a non-sequential transfer during the same clock cycle that the transfer request is initiated, then the decoder 165 is arranged to insert the decode cycle every time a non-sequential transfer is indicated by the BTRAN [1:0] signal. This occurs irrespective of the actual master logic unit 200 initiating the non-sequential transfer, and hence, although ensuring correct handling of the transfer requests, adversely affects the overall performance of the data processing apparatus. In effect, the performance of all of the master logic units is restricted by the performance of the slowest master logic unit in the data processing apparatus.

Further, this approach can unnecessarily affect the performance of even the slowest logic unit in the data processing apparatus in cases where its signal timing improves. One example of this is when the system is run at a lower clock frequency than originally designed, such as may occur during testing, and as a result of this, the original timing constraints disappear.

In preferred embodiments of the present invention, this problem is overcome by encoding the signal identifying the particular transfer type with a timing indication that is used to control the timing of the receipt of the transfer request by the slave logic unit 210. In particular, in preferred embodiments, this encoding is applied to non-sequential transfers, since these are the transfer type which in preferred embodiments can require insertion of the decode cycle.

Hence, in accordance with preferred embodiments of the present invention, the following meanings are assigned to particular BTRAN [1:0] signal values:

| BTRAN [1:0] | TRANSFER TYPE | TIMING ENCODING |
|---|---|---|
| 00 | Address-only | Irrelevant |
| 01 | Non-sequential, Non-decode | Good timing |
| 10 | Non-sequential, Decode | Poor timing |
| 11 | Sequential | Good timing |

As mentioned earlier, address-only transfers are merely used to keep the system bus driven, and hence the timing is irrelevant, since the decoder will not be asserting a select signal to any slave logic unit. Further, as mentioned earlier, sequential transfers typically have good timing, and do not require the insertion of a decode cycle. However, for non-sequential transfers, the encoding in accordance with preferred embodiments provides two different BTRAN [1:0] signals. If the BTRAN [1:0] signal is 01, then this indicates to the decoder 165 that the transfer is a non-sequential transfer, but that the master logic unit is able to output the necessary transfer request signals onto the bus during the same clock cycle that the transfer request is initiated. Hence, a decode cycle is not required, and the decoder 165 can send a select signal to the appropriate slave logic unit 210 without delay. However, a BTRAN [1:0] signal having a value of 10 indicates that the transfer is a non-sequential transfer, but that the necessary transfer request signals will not be available during the same clock cycle that the transfer request is initiated. Accordingly, the decoder 165 interprets a BTRAN [1:0] signal of 10 as a requirement to insert a decode cycle prior to asserting the select signal to the appropriate slave logic unit 210.

The advantage of this type of encoding is that the data processing apparatus does not to be constrained to either a decode cycle scheme or a no-decode cycle scheme, since both implementations can co-exist in the same design, and therefore the performance of the data processing apparatus can be enhanced by taking into account the singularities of each master logic unit.

Further, the design of the decoder can now be standardised, since there is no need to distinguish between a "decoder with decode cycles" design, and a "decoder without decode cycles" design.

Hence, master logic units such as the fast DMA unit 150, and the TIC 100 can encode non-sequential transfers with a BTRAN [1:0] signal of 01, thereby indicating that a decode cycle is not required, whilst slower master logic units such as the processor 140 can keep the original non-sequential BTRAN [1:0] signal of 10, but this now consciously mandating the insertion of a decode cycle by the decoder 165.

It will be appreciated that the above technique also allows for design of the master logic unit to include a mechanism for moving from one non-sequential transfer encoding to another dependent on various factors, for example clock speed. Therefore, if the final design is to be run at half the original frequency, then all of the master logic units could be programmed to encode a non-sequential transfer with a BTRAN [1:0] signal of 01, thereby removing the requirement for a decode cycle in all cases.

Figure 3:
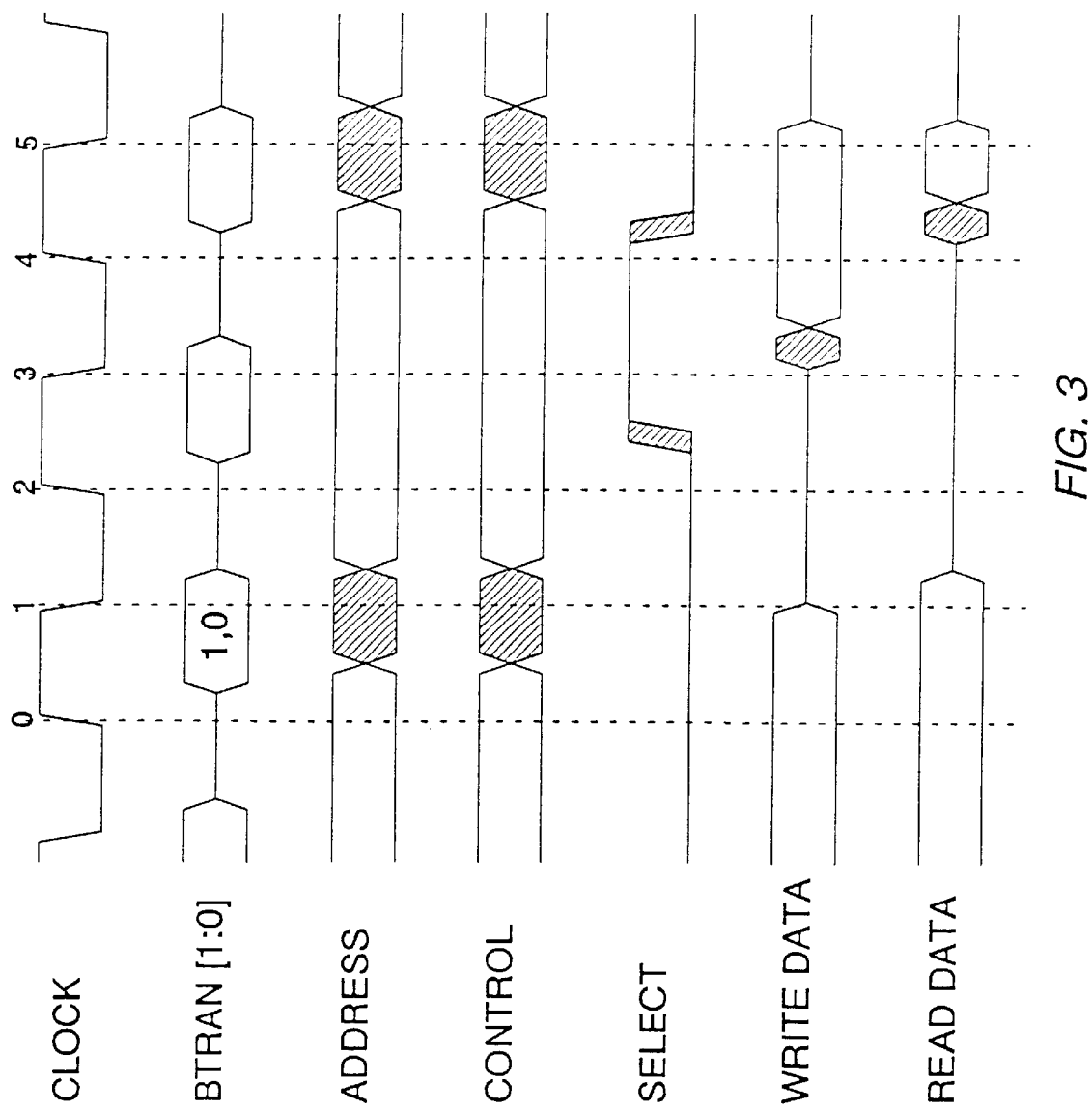
FIG. 3 is a timing diagram illustrating a non-sequential transfer with a decode cycle in accordance with preferred embodiments of the present invention.
Figure 4:
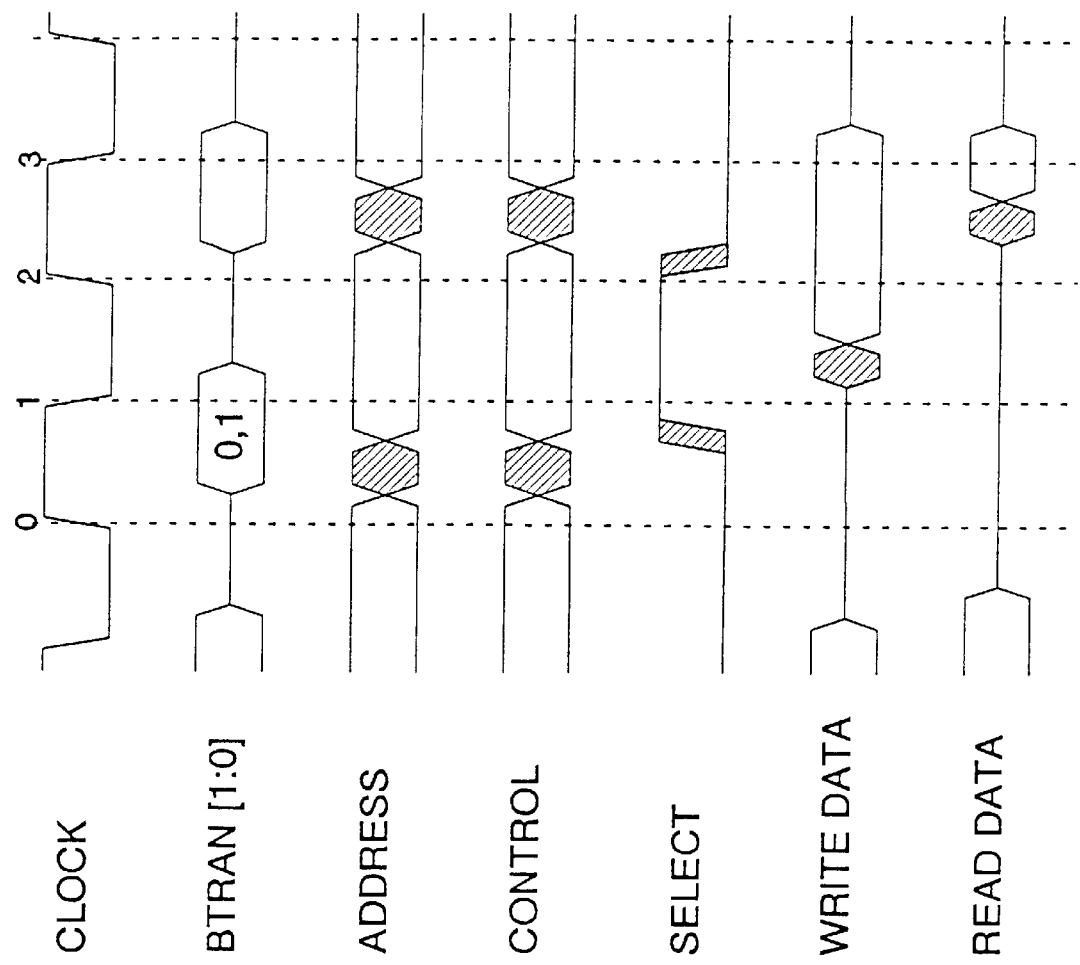
FIG. 4 is a timing diagram illustrating a non-sequential transfer without a decode cycle in accordance with preferred embodiments of the present invention.

FIGS. 3 and 4 are timing diagrams illustrating the relative timing of various signals within the data processing apparatus, dependent on the values of the BTRAN [1:0] signal. If the BTRAN [1:0] signal has a value 10, thereby indicating a non-sequential transfer that requires a decode cycle, the timing of the relevant signals is indicated by the timing diagram of FIG. 3. Between points 0 and 1 of the clock cycle, the decoder 165 samples the BTRAN [1:0] signal, which in this case has a value of 10. This value is chosen by the master logic unit since the control and address signals will not become valid between points 0 and 1, but rather between points 2 and 3 illustrated in FIG. 3. Accordingly, the decoder determines that a decode cycle should be inserted before driving the select signal, and hence the select signal is not asserted at this time.

On the falling edge of the clock cycle, ie. at point 1 indicated in FIG. 3, the slave logic unit samples the select signal, but since the select signal is not asserted, does not read the contents of the bus. With reference to the address and control signals, the shaded region indicates a period of time during which the address and control signals are not valid, but rather are in a state of transition. Hence, at point 1, it can be seen that the address and control signals are not valid, and hence it would be inappropriate for the slave logic unit to sample those signals at the falling edge of the clock identified by point 1 in FIG. 3.

Between points 2 and 3 of the next clock cycle, the select signal is asserted by the decoder, since the decode cycle has now been inserted. Hence, on the falling edge of the clock cycle, as identified by point 3 in FIG. 3, the slave logic unit samples the select signal, which is now asserted, and hence samples the contents of the bus. This will involve the slave logic unit reading the address and control signals from the bus.

During the next clock cycle, ie. between points 3 and 5 in FIG. 3, the slave logic unit will now perform the necessary read or write operation, and the transfer process will then complete at point 5 identified in FIG. 3. In the event of a read operation, the master logic unit will be arranged to read the contents of the data bus on the falling edge of the clock cycle indicated by point 5 in FIG. 3, by which time the slave logic unit will have output the necessary read data onto the data bus. In the event of a write operation, the slave logic unit will read at point 5 the write data signal from the bus and store that data at the selected address. A new bus transfer request can then begin.

Since the transfer request completes at point 5, the BTRAN [1:0] signal issued between points 4 and 5 will define the transfer type of the next transfer. The value of the BTRAN [1:0] signal issued between points 2 and 3 is not relevant in preferred embodiments, since the BTRAN [1:0] signal is only sampled by the decoder 165 at the start of a transfer. Hence, typically, the BTRAN [1:0] signal issued between points 2 and 3 will be the same as the one issued between points 0 and 1, and so will have a value 10.

FIG. 4 is a timing diagram illustrating the relative timing of the signals when the BTRAN [1:0] signal has a value of 01, this value being chosen by the master logic unit to indicate that the address and control signals will become valid between points 0 and 1 illustrated in FIG. 4. Therefore the value 01 indicates to the decoder a non-sequential transfer where no decode cycle is required.

As illustrated in FIG. 4, between points 0 and 1, the address and control signals become valid. Further, the decoder samples the BTRAN [1:0] signal, and determines that no decode cycle is required. Accordingly, the select signal is asserted. Hence, on the falling edge of the clock as indicated by point 1 in FIG. 4, the slave logic unit samples the select signal, and given that the select signal is asserted, samples the address and control signals from the bus.

The operation that the slave logic unit needs to perform is then carried out during the clock cycle between points 1 and 3 indicated in FIG. 4, and the process completes at point 3, ie. on the falling edge of that clock cycle. In the event of a read operation, the master logic unit is arranged to read the contents of the data bus on the falling edge of the clock cycle indicated by point 3 in FIG. 4, and thereafter the read data is removed from the bus. In the event of a write operation, the slave logic unit will read at point 3 the write data signal from the bus and store that data at the selected address. A new bus transfer request can then begin. Since the transfer request completes at point 3, the BTRAN [1:0] signal issued between points 2 and 3 will define the transfer type of the next transfer.

In accordance with the above described technique, overall system performance can be improved at both maximum operating frequency, and at lower frequencies, whilst providing a generic approach for tuning the timing of transfer requests. It should be noted that whilst the preferred embodiment of the present invention has been described with reference to the AMBA specification, and in particular with reference to encoding of the BTRAN [1:0] signal, the data processing apparatus need not employ the AMBA specification, and the benefits of the present invention can be provided within any data processing system by encoding a signal identifying a particular action with information that also infers timing.

Although a particular embodiment has been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

I claim:

1. A data processing apparatus, comprising:
    a bus for interconnecting a number of logic units, data being transferable between the logic units via the bus;
    a first logic unit for issuing onto a bus a transfer request and a type signal indicating the type of the transfer request;
    a second logic unit for receiving the transfer request from the bus and performing an operation in response to the transfer request;
    the first logic unit being arranged to encode within the type signal a timing indication used to control the timing of the receipt of the transfer request by the second logic unit.

2. A data processing apparatus as claimed in claim 1, further comprising a decoder for asserting a select signal to the second logic unit to cause the second logic unit to read the transfer request from the bus, the decoder being arranged to receive the type signal from the bus and to determine from the timing indication when to assert the select signal to the second logic unit.

3. A data processing apparatus as claimed in claim 1, further comprising: a clock generator for generating a clock signal having a predetermined clock cycle, the timing indication encoded in the type signal indicating in which clock cycle the transfer request should be received from the bus by the second logic unit.

4. A data processing apparatus comprising:
    a bus for interconnecting a number of logic units, data being transferable between the logic units via the bus;
    a first logic unit for issuing onto said bus a transfer request and a type signal indicating the type of the transfer request;
    a second logic unit for receiving the transfer request from the bus and performing an operation in response to the transfer request;
    the first logic unit being arranged to encode within the type signal a timing indication used to control the timing of the receipt of the transfer request by the second logic unit,
    said apparatus further comprising:
        a clock generator for generating a clock signal having a predetermined clock cycle, the timing indication encoded in the type signal indicating in which clock cycle the transfer request should be received from the bus by the second logic unit, wherein the timing indication identifies whether the transfer request is available to be received from the bus by the second logic unit during the same clock cycle that the type signal is generated by the first logic unit, or in a predetermined subsequent clock cycle.

5. A data processing apparatus as claimed in claim 4, wherein the transfer request is a non-sequential transfer and the first logic unit is able to drive onto the bus during the same clock cycle that the type signal is generated the transfer request signals required by the second logic unit, the timing indication encoded into the type signal indicating that the transfer request is available to be received from the bus by the second logic unit during the same clock cycle that the type signal is generated by the first logic unit.

6. A data processing apparatus as claimed in claim 4, wherein the transfer request is a non-sequential transfer and the first logic unit is able to drive onto the bus by the predetermined subsequent clock cycle the transfer request signals required by the second logic unit, the timing indication encoded into the type signal indicating that the transfer request is available to be received from the bus by the second logic unit during the predetermined subsequent clock cycle.

7. A data processing apparatus as claimed in claim 5, further comprising:
    a decoder for asserting a select signal to the second logic unit to cause the second logic unit to read the transfer request from the bus, the decoder being arranged to receive the type signal from the bus;
    if the timing indication indicates that the transfer request is available to be received from the bus by the second logic unit during the same clock cycle that the type signal is generated by the first logic unit, then the decoder being arranged to assert the select signal without delay; and
    if the timing indication indicates that the transfer request is available to be received from the bus by the second logic unit during the predetermined subsequent clock cycle, then the decoder being arranged to delay asserting the select signal until said predetermined subsequent clock cycle.

8. A data processing apparatus as claimed in claim 4, wherein the predetermined subsequent clock cycle is the clock cycle immediately following the clock cycle in which the type signal is generated by the first logic unit.

9. A data processing apparatus as claimed in claim 3, wherein the second logic unit is arranged to read the transfer request from the bus at a predetermined point in the clock cycle indicated by the timing indication.

10. A data processing apparatus comprising:
    a bus for interconnecting a number of logic units, data being transferable between the logic units via the bus;
    a first logic unit for issuing onto said bus a transfer request and a type signal indicating the type of the transfer request;
    a second logic unit for receiving the transfer request from the bus and performing an operation in response to the transfer request;
    the first logic unit being arranged to encode within the type signal a timing indication used to control the timing of the receipt of the transfer request by the second logic unit, wherein the type signal is a two-bit signal, and the value of the two bits provides the timing indication in addition to identifying the type of the transfer request.

11. A method of controlling timing of transfer requests employed in a data processing apparatus to transfer data between logic units interconnected by a bus, comprising the steps of:
    issuing onto the bus from a first logic unit a transfer request and a type signal indicating the type of the transfer request;
    receiving at a second logic unit the transfer request from the bus and performing an operation in response to the transfer request; and encoding within the type signal a timing indication used to control the timing of the receipt of the transfer request by the second logic unit.

12. A method as claimed in claim 11, further comprising the steps of: employing a decoder to assert a select signal to the second logic unit to cause the second logic unit to read the transfer request from the bus; and arranging the decoder to receive the type signal from the bus and to determine from the timing indication when to assert the select signal to the second logic unit.

13. A data processing apparatus comprising:

a bus for interconnecting a number of logic units, data being transferable between the logic units via the bus;

a first logic unit for issuing onto said bus a transfer request and a type signal indicating the type of the transfer request;

a second logic unit for receiving the transfer request from the bus and performing an operation in response to the transfer request;

the first logic unit being arranged to encode within the type signal a timing indication used to control the timing of the receipt of the transfer request by the second logic unit, and a clock generator for generating a clock signal having a predetermined clock cycle, the timing indication encoded in the type signal indicating in which clock cycle the transfer request should be received from the bus by the second logic unit.

14. A method of controlling timing of transfer requests employed in a data processing apparatus to transfer data between logic units interconnected by a bus, comprising the steps of:

issuing onto the bus from a first logic unit a transfer request and a type signal indicating the type of the transfer request;

receiving at a second logic unit the transfer request from the bus and performing an operation in response to the transfer request;

encoding within the type signal a timing indication used to control the timing of the receipt of the transfer request by the second logic unit; and generating a clock signal having a predetermined clock cycle, the timing indication encoded in the type signal indicating in which clock cycle the transfer request should be received from the bus by the second logic unit.

* * * * *